US010230870B2

(12) United States Patent
Kogure et al.

(10) Patent No.: US 10,230,870 B2
(45) Date of Patent: Mar. 12, 2019

(54) IMAGE PROCESSING DEVICE AND NON-TRANSITORY COMPUTER-READABLE MEDIUM FOR ESTIMATING FUNCTION TO BE EXECUTED

(71) Applicant: FUJI XEROX CO., LTD., Tokyo (JP)

(72) Inventors: Kenji Kogure, Kanagawa (JP); Nobuyuki Obayashi, Kanagawa (JP); Kenji Nomura, Kanagawa (JP); Takeshi Ichimura, Kanagawa (JP); Masaki Kurokawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/594,956

(22) Filed: May 15, 2017

(65) Prior Publication Data

US 2018/0063378 A1 Mar. 1, 2018

(30) Foreign Application Priority Data

Aug. 29, 2016 (JP) ................................ 2016-166531

(51) Int. Cl.
*G06K 15/00* (2006.01)
*H04N 1/44* (2006.01)
*H04N 1/00* (2006.01)

(52) U.S. Cl.
CPC ....... *H04N 1/4433* (2013.01); *H04N 1/00068* (2013.01); *H04N 1/00832* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

2010/0290071 A1* 11/2010 Okada ................ H04N 1/00244 358/1.13
2011/0051165 A1* 3/2011 Yamada ................ G06F 3/1203 358/1.13
2012/0062937 A1* 3/2012 Kirihara ............. H04N 1/00517 358/1.15

FOREIGN PATENT DOCUMENTS

JP 2011-211251 A 10/2011
JP 2011211251 A * 10/2011

* cited by examiner

*Primary Examiner* — Henok Shiferaw
(74) *Attorney, Agent, or Firm* — Oliff PLC

(57) ABSTRACT

An image processing device includes an authenticator, an estimator, and a controller. The authenticator uses authentication information received from a user to authenticate and determine whether or not the user is a person allowed to execute plural functions related to images. If the authenticator authenticates the user as a registered user allowed to execute the plural functions, the estimator uses history information recording information related to the execution of the plural functions to estimate a function to be executed by the user from among the plural functions. The controller controls related parts used to execute the function estimated by the estimator so that the related parts start preparing for operation before the user issues an instruction to execute some kind of function.

15 Claims, 12 Drawing Sheets

| No | USER ID | DATA REGISTRATION TIME | AUTHENTICATION TIME | AUTHENTICATION WEEKDAY | FUNCTION USED |
|---|---|---|---|---|---|
| 1 | User-A | 2016/10/01 10:00:02 | 2016/10/01 10:01:15 | SATURDAY | PRINT |
| 2 | User-B | — | 2016/09/30 17:55:02 | FRIDAY | FACSIMILE |
| 3 | User-C | — | 2016/09/30 14:23:03 | FRIDAY | SCAN |
| 4 | User-C | — | 2016/09/30 10:23:47 | FRIDAY | COPY |
| 5 | User-A | 2016/09/30 10:09:15 | 2016/09/30 10:10:18 | FRIDAY | PRINT |
| 6 | User-B | — | 2016/09/29 13:45:29 | THURSDAY | FACSIMILE |
| 7 | User-A | 2016/09/29 10:02:12 | 2016/09/29 10:02:51 | THURSDAY | PRINT |
| 8 | User-A | — | 2016/09/29 08:49:18 | THURSDAY | COPY |

| FUNCTION | DOCUMENT READING UNIT | IMAGE FORMING UNIT | HDD | COMMUNICATION UNIT | EXTERNAL TERMINAL |
|---|---|---|---|---|---|
| COPY | ○ | ○ | ○ | × | × |
| PRINT | × | ○ | ○ | ○ | × |
| FACSIMILE | ○ | × | ○ | ○ | × |
| SCAN (TRANSMIT) | ○ | × | ○ | ○ | × |
| SCAN (MEMORY) | ○ | × | ○ | × | ○ |
| : | : | : | : | : | : |

IMAGE PROCESSING DEVICE AND NON-TRANSITORY COMPUTER-READABLE MEDIUM FOR ESTIMATING FUNCTION TO BE EXECUTED

CROSS-REFERENCE TO RELATED APPLICATIONS

This application is based on and claims priority under 35 USC 119 from Japanese Patent Application No. 2016-166531 filed Aug. 29, 2016.

BACKGROUND

Technical Field

The present invention relates to an image processing device and a non-transitory computer-readable medium.

SUMMARY

According to an aspect of the invention, there is provided an image processing device that includes an authenticator, an estimator, and a controller. The authenticator uses authentication information received from a user to authenticate and determine whether or not the user is a person allowed to execute plural functions related to images. If the authenticator authenticates the user as a registered user allowed to execute the plural functions, the estimator uses history information recording information related to the execution of the plural functions to estimate a function to be executed by the user from among the plural functions. The controller controls related parts used to execute the function estimated by the estimator so that the related parts start preparing for operation before the user issues an instruction to execute some kind of function.

BRIEF DESCRIPTION OF THE DRAWINGS

Exemplary embodiments of the present invention will be described in detail based on the following figures, wherein:

FIG. 4 is a diagram illustrating an example of a history database (DB);

FIG. 7 is a diagram illustrating an example of a function-related parts table;

DETAILED DESCRIPTION

Hereinafter, exemplary embodiments for carrying out the present invention will be described in detail and with reference to the drawings. Note that structural elements responsible for actions having the same effect or function are denoted with the same signs throughout all drawings, and duplicate description thereof will be reduced or omitted.

First Exemplary Embodiment

Figure 1:
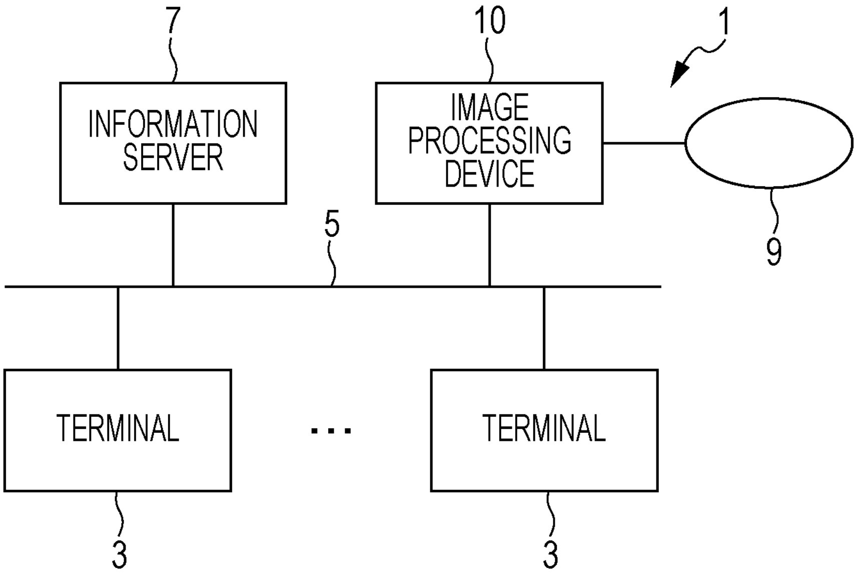
FIG. 1 is a diagram illustrating an example of an image processing system.

FIG. 1 illustrates an example of an image processing system 1. As illustrated in FIG. 1, in the image processing system 1, multiple terminals 3 used by respective users, an image processing device 10 that executes multiple predetermined image-related functions in accordance with instructions from users, and an information server 7 that includes information about which people are allowed to use the image processing device 10 and the like are connected by a communication link 5. The image processing device 10 is also connected to a public network 9, to which telephone subscriber lines or the like are connected.

In some cases, for example, a user transmits image data generated by one of the terminals 3 to the image processing device 10 via the communication link 5, and causes the image processing device 10 to execute desired image processing.

In addition, in some cases a user takes a recording medium, such as one or more sheets of paper on which images are formed (hereinafter also designated a "document"), to the image processing device 10, places the document in the image processing device 10, and causes the image processing device 10 to execute desired image processing.

Furthermore, for example, in some cases a user transmits image data subjected to image processing by the image processing device 10 to an information device (not illustrated) via the communication link 5 or the public network 9, or outputs the image data to a portable storage medium such as Universal Serial. Bus (USB) memory or a memory card attached to the image processing device 10.

Herein, the connection mode of the communication link 5 is not limited, and may be any connection mode from among wired, wireless, or a mixture of wired and wireless. Also, the number of terminals 3 connected to the image processing device 10 is not limited. For example, in some cases only a single terminal 3 may be connected. Also, the image processing device 10 is not necessarily connected to the public network 9.

The image processing device 10 is configured to be usable by predetermined users. A user inputs a user ID uniquely associated with that user and a password (hereinafter designated "authentication information") into the image processing device 10, and if the user is authenticated as a predetermined user allowed to use the image processing device 10, usage of the image processing device 10 is allowed. In other words, if the user is not authenticated as a predetermined user, the user is unable to use the image processing device 10.

Note that a list of the authentication information for the users allowed to use the image processing device 10 is stored in advance in the information server 7, for example.

In the following, a configuration in which multiple terminals 3 are connected to the image processing device 10 via the communication link 5, and multiple users share the image processing device 10 will be described as an example.

Figure 2:
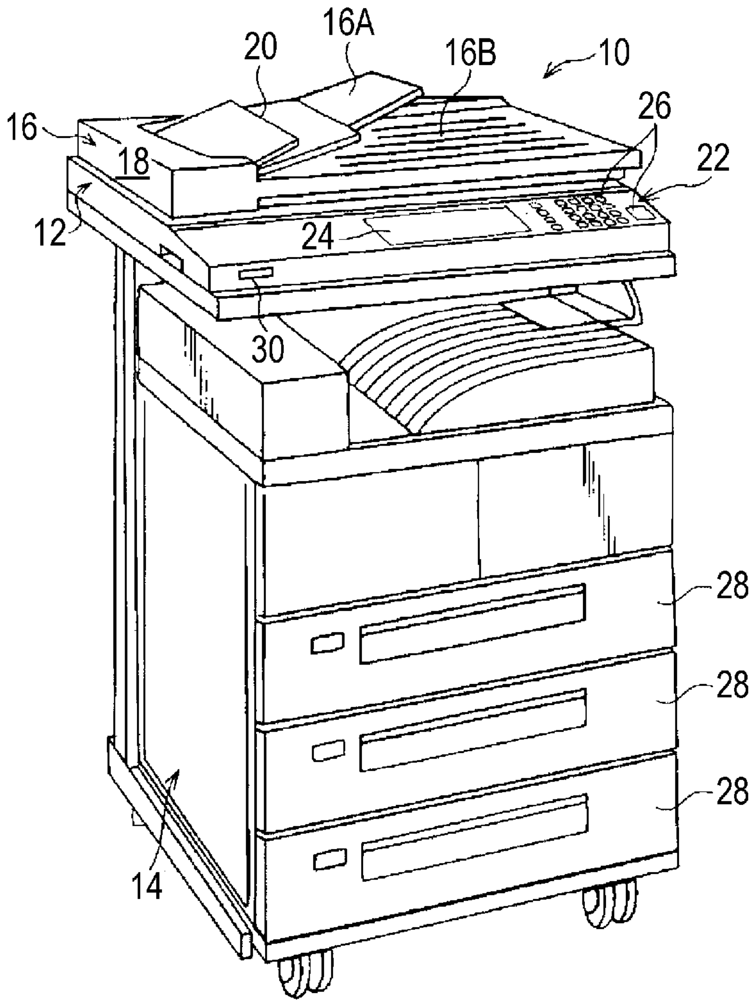
FIG. 2 is a schematic perspective view illustrating an example of an image processing device.

FIG. 2 is a schematic perspective view of the image processing device 10. As an example, the image processing device 10 includes a scan function that reads in an image formed on a document as image data, an image forming function (hereinafter designated the "print function") that forms an image corresponding to image data onto a recording medium, a facsimile function that transmits image data to an information device connected to the public network 9, and a copy function that duplicates an image formed on a document onto another recording medium.

Note that the functions included in the image processing device 10 are not limited to a scan function, a print function, a facsimile function, and a copy function. For example, a function of forming a three-dimensional object on the basis of data, like a 3D printer, for example, may also be included.

In the upper part of the image processing device 10 a document reading unit 12 is provided, for example, and an image forming unit 14 is disposed underneath the document reading unit 12.

The document reading unit 12 includes an optical reading device (not illustrated) and a document transport unit 18 inside a document cover 16. The document transport unit 18 sequentially draws in a document 20 placed in a document tray 16A provided on the document cover 16 one sheet at a time, and transports the sheets onto a transported document reading platen (not illustrated). Subsequently, the document reading unit 12 reads in an image of the document 20 transported onto the transported document reading platen (not illustrated) with the optical reading device (not illustrated) as image data. After that, the document transport unit 18 delivers the document 20 whose image has been read into a delivery tray 16B provided on the document cover 16.

On the other hand, the image forming unit 14 forms an image based on image data by an electrophotographic system, for example, onto a recording medium housed in a paper housing unit 28, in which different recording media are classified by type and size. Note that the image forming unit 14 is not limited by the color of the image to form onto the recording medium, which may be a color image or a black and white image.

When executing the scan function, the image processing device 10 uses the document reading unit 12 to read in the content of a document 20 placed in the document tray 16A, and convert the content into image data. Subsequently, the image processing device 10 obeys an instruction from the user and stores the acquired image data on a portable storage medium attached to the image processing device 10, or transmits the acquired image data to another information device connected to the communication link 5.

Also, when executing the print function, for example, the image processing device 10 receives image data to be printed from the terminal 3 via the communication link 5, and uses the image forming unit 14 to form the received image data onto a recording medium.

Also, when executing the facsimile function, the image processing device 10 uses the document reading unit 12 to read in the content of a document 20 placed in the document tray 16A, and convert the content into image data. Subsequently, the image processing device 10 transmits the acquired image data to an information device on the public network 9 specified by the user.

Also, when executing the copy function, the image processing device 10 uses the document reading unit 12 to read in the content of a document 20 placed in the document tray 16A, and convert the content into image data. Subsequently, the image processing device 10 uses the image forming unit 14 to form the acquired image data onto a recording medium.

Meanwhile, the image processing device 10 is provided with an operation and display unit 22 that accepts operations related to the execution of various functions from the user, and also displays various information associated with the execution of a function by the image processing device 10. Specifically, the operation and display unit 22 is provided with a display 24 overlaid with a touch panel, on which a software program displays elements such as display buttons that accept instructions from the user and various information, as well as hardware keys 26 such as a keypad and a Start button, or the like.

Additionally, the operation and display unit 22 is provided with an external terminal 30 that acts as an interface for connecting a portable storage medium to read data such as image data stored in the portable storage medium into the image processing device 10, and also write data inside the image processing device 10, such as image data scanned from a document 20 by the scan function, for example, to the portable storage medium.

Figure 3:
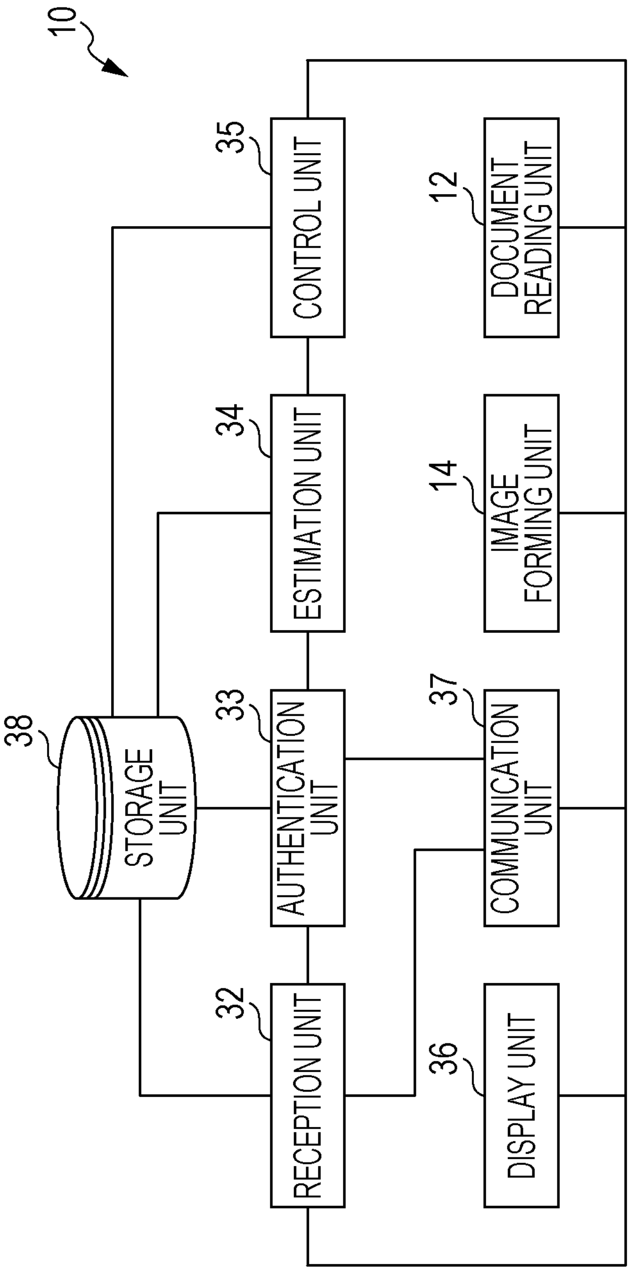
FIG. 3 is a diagram illustrating an exemplary functional configuration of an image processing device.

FIG. 3 is a block diagram illustrating an exemplary configuration of the image processing device 10. The image processing device 10 includes the document reading unit 12, the image forming unit 14, a reception unit 32, authentication unit 33, an estimation unit 34, a control unit 35, a display unit 36, a communication unit 37, and a storage unit 38.

The reception unit 32 receives authentication from the user and operations related to the execution of a function, such as an instruction, to execute a function. In addition, the reception unit 32 receives image data from the communication link 5, the public network 9, or the portable storage medium. Also, the reception unit 32 sequentially stores the times at which image data is received (data registration times) and what operations are received as history information in the storage unit 38. When authentication information is received, the reception unit 32 reports the received authentication information to the authentication unit 33.

The authentication unit 33, which is an example of an authenticator, receives authentication information input by the user from the reception unit 32, and subsequently acquires a list of authentication information (allowed user information) of the users allowed to use the image processing device 10 (registered users) from the information server 7 via the communication unit 37, for example. Additionally, the authentication unit 33 references the allowed user information, and determines whether or not the authentication information received from the reception unit 32 is included in the allowed user information. If the received authentication information is included in the allowed user information, the authentication unit 33 allows the user corresponding to the received authentication information to use the image processing device 10. On the other hand, if the received authentication information is not included in the allowed user information, the authentication unit 33 does not allow the user corresponding to the received authentication information to use the image processing device 10.

Specifically, if the authentication information received from the reception unit 32 is not included in the allowed user information, the authentication unit 33 reports usage unavailable information to the reception unit 32. The reception unit 32 receiving the usage unavailable information refuses to accept operations related to the execution of a function from the user, and thereby disallows the user who input authentication information not included in the allowed user information from using the image processing device 10, until authentication information included in the allowed users information is received.

Note that the authentication unit 33 stores the time at which the user is authenticated as a registered user allowed to the use the image processing device 10 (authentication time) and the user ID of the user as history information in the storage unit 38, and reports authentication completion information, which indicates that authentication information has been received from a user who is a registered user, to the estimation unit 34.

The estimation unit 34, which is an example of an estimator, receives authentication information from the authentication unit 33, references the history information stored in the storage unit 38, and estimates a function to be executed by the user from among the scan function, print function, facsimile function, and copy function provided in the image processing device 10. Note that the method of estimating the function to be executed by the user will be discussed later.

Subsequently, the estimation unit 34 reports the estimated function to the control unit 35.

On the basis of the estimated function received from the estimation unit 34, the control unit 35, which is an example of a controller, controls each of the parts used in the execution of the estimated function so as to start preparing for the operation of each of the parts, before the reception unit 32 receives an execution instruction to execute some kind of function from the user.

In the image processing device 10, to moderate power consumption while in a standby state in which no function is being executed, in the standby state of the image processing device 10, the control unit 35 sets the parts used in the execution of functions, specifically the document reading unit 12, the image forming unit 14, the reception unit 32, the display unit 36, the communication unit 37, and the storage unit 38, to a dormant state in which only a minimum level of operation is performed, such as receiving control from the control unit 35.

To make the parts put in the dormant state operate within a predetermined amount of time after an execution instruction to execute some kind of function is received, it is preferable to cancel the dormant state in advance, to bring each of the parts out of the dormant state and into an active state in which operation related to the execution of a function may be started.

Consequently, before the reception unit 32 receives an execution instruction from the user, the control unit 35 controls each of the parts used in the execution of the estimated function, and conducts a preparatory operation to bring each part out of the dormant state and into the active state.

Note that the display unit 36 displays information in accordance with an instruction from the control unit 35 on the display 24 of the operation and display unit 22. The communication unit 37 is connected to the communication link 5 and the public network 9, transmitting and receiving data between the image processing device 10 and information devices connected to the communication link 5 and the public network 9.

In the storage unit 38, image data received by the reception unit 32 and history information are stored. Note that a user ID is attached to the image data, making it possible to identify the user from which the image data is received.

FIG. 4 is a diagram illustrating an example of a history database (DB) 39 in which history information is managed and which is stored in the storage unit 38. As illustrated in FIG. 4, each piece of history information managed by the history DB 39 includes a number (No) expressing a number assigned to uniquely identify the history, a user ID, a data registration time, an authentication time, a weekday corresponding to the authentication time (authentication weekday), and a function used, which expresses the function that the user instructed the image processing device 10 to execute.

Note that the history information illustrated in FIG. 4 is an example, and the information stored as history information is not limited to this information. For example, attributes prescribing execution operations related to each function may also be included in the history information.

Specifically, if the function to execute is the print function, a setting for enlarging or reducing the image when forming image data onto the recording medium, a setting for the size of the recording medium on which to form the image data, and a setting related to the sides on which to form images, such as double-sided printing or single-sided printing, may also be included in the history information, for example.

If the function to execute is the scan function, a setting for the resolution when reading in the document 20 with the document reading unit 12 and a setting related to the document content, such as whether the content of the document 20 is an image or text, may also be included in the history information, for example.

If the function to execute is the facsimile function, a setting related to whether or not to apply a stamp to the document 20 read in by the document reading unit 12, and a setting related to whether or not to output a recording medium recording the communication result when communication finishes may also be included in the history information, for example.

If the function to execute is the copy function, a setting specifying the number of pages of the document 20 to form on one sheet of the recording medium, also known as "layout", and a copy mode setting that specifies whether to copy the document 20 in color or in black and white may be included in the history information, for example.

In the history DB 39 illustrated in FIG. 4, the No. 1 history information indicates that the user with the user ID "User-A" registered image data in the image processing device 10 on Oct. 1, 2016 at 10:00:02, the user who input authentication information on Oct. 1, 2016 at 10:01:15 was authenticated as a registered user, and the print function was executed.

Note that the symbol "-" in the data registration time column indicates that the reception unit 32 did not receive image data prior to authenticating the user of the image processing device 10 as a registered user or not. If the function used on the image processing device 10 is the scan function, the facsimile function, or the copy function, the user may sometimes conduct authentication first and then acquire image data by reading in a document 20 with the document reading unit 12, and thus a data registration time may not be recorded.

Note that in the following, the function estimated by the estimation unit 34 as the function likely to be executed next by the user may also be referred to as the "expected function" in some cases.

Next, a schematic configuration of the electrical subsystem of the image processing device 10 according to the first exemplary embodiment will be described with reference to FIG. 5.

The reception unit 33, the authentication unit 33, the estimation unit 34, and the control unit 35 of the image processing device 10 are realized using a computer 100, for example.

In the computer 100, a central processing unit (CPU) 102, random access memory (RAM) 104, a hard disk drive (HDD) 106, non-volatile memory 108, and an input/output interface (I/O) 110 are interconnected via a bus 112. Connected to the I/O 110 are the document reading unit 12, the image forming unit 14, the display 24, an input device 70, and a communication device 72.

The CPU 102 includes a built-in calendar function, for example, and by using the calendar function, the CPU 102 is able to acquire date and time information, such as the date, time, and weekday when the calendar function is executed.

The RAM 104 is used as a work area when the CPU 102 executes a program, while the HDD 106 stores in advance a program prescribing the operation of the image processing device 10. Furthermore, the non-volatile memory 108 stores in advance information such as various parameters and tables referenced by the CPU 102 when executing a program.

The input device 70 includes the touch panel overlaid onto the operation and display unit 22, the hardware keys 26, and the external terminal 30 that connects a portable storage medium.

The communication device 72 connects the image processing device 10 to the communication link 5, transmitting and receiving data to and from the terminal 3 and the information server 7. Also, the communication device 72 connects the image processing device 10 to the public network 9, transmitting and receiving image data to and from information devices including a facsimile function connected to the public network 9.

Figure 5:
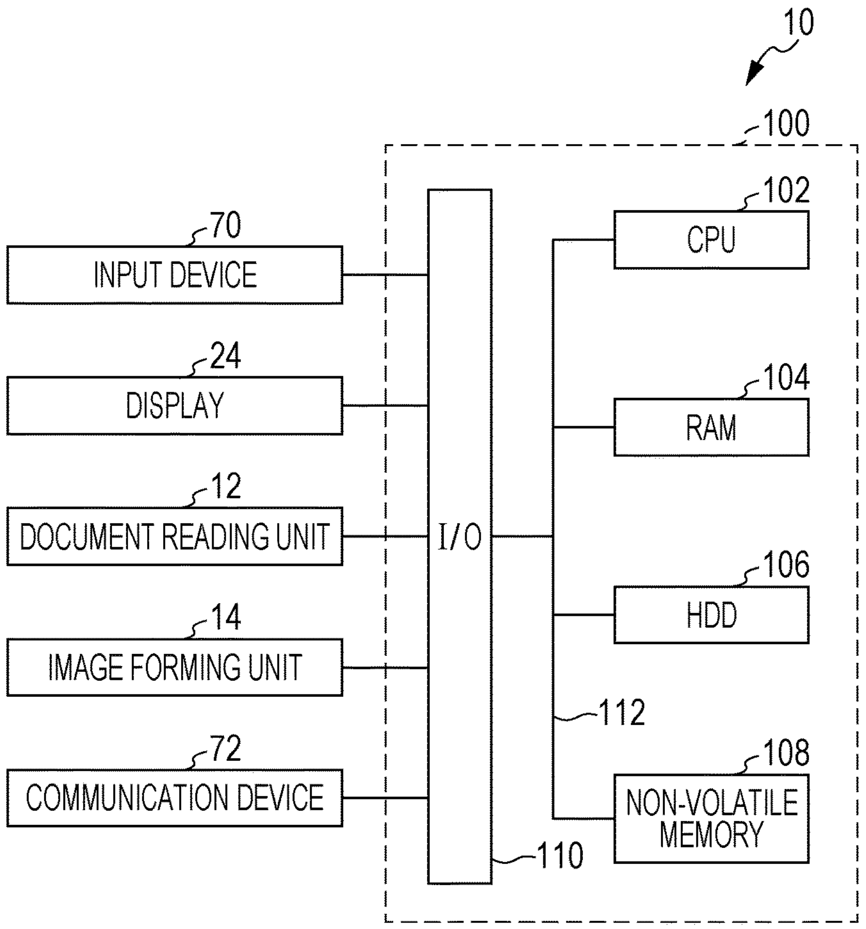
FIG. 5 is a diagram illustrating an exemplary schematic configuration of the electrical subsystem of an image processing device.

Note that the devices connected to the I/O 110 illustrated in FIG. 5 are an example, and the devices connected to the I/O 110 are not limited to the devices illustrated in FIG. 5.

Figure 6:
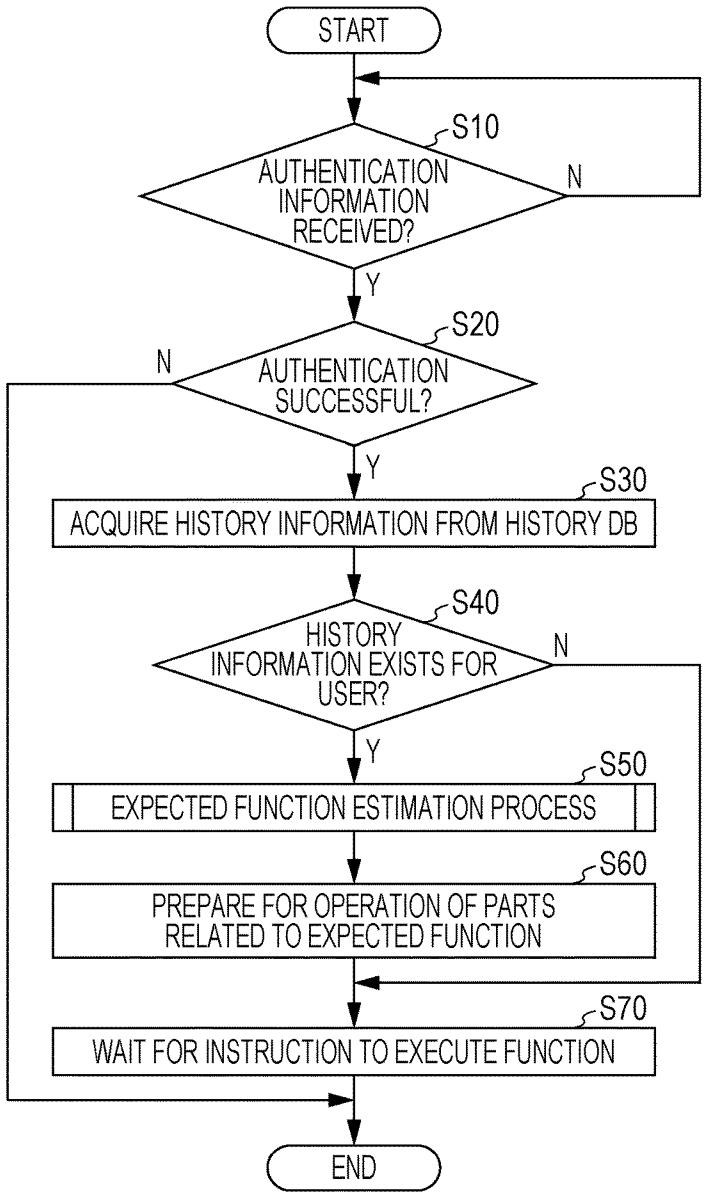
FIG. 6 is a flowchart illustrating an example of the flow of an image processing program according to a first exemplary embodiment.

Next, the action of the image processing device 10 will be described. FIG. 6 a flowchart illustrating an example of the flow of an image processing program executed by the CPU 102 when the image processing device 10 is powered on and in a standby state in which the image processing device 10 is not executing any function. The image processing program illustrated in FIG. 6 is installed in advance in the HDD 106, for example. In addition, the history DB 39 is also stored in the HDD 106, for example, and when the image processing device 10 is powered on, the history DB 39 is loaded into the RAM 104 by the CPU 102. Note that herein, history information related to functions executed thus far on the image processing device 10 is assumed to be recorded in advance in the history DB 39.

First, in step S10, the authentication unit 33 determines whether or not, for example, authentication information has been received from the reception unit 32 as a result of a user operating the touch panel or the hardware keys 26, which are examples of the input device 70.

If authentication information has not been received, the process in step S10 is repeated until authentication information is reported from the reception unit 32. On the other hand, when authentication information is received, the flow proceeds to step S20.

Note that the method by which the user inputs the authentication information is not limited to operating the touch panel or the hardware keys 26. For example, the user may also input authentication information by causing reading device to read the contents of an integrated circuit (IC) card on which the authentication information is recorded in advance.

In step S20, the authentication unit 33 determines whether or not the authentication information received in step S10 is the authentication information of a registered user allowed to the use the image processing device 10.

Specifically, the authentication unit 33 acquires allowed user information from the information server 7, for example, and determines whether or not the same authentication information as the authentication information received from the reception unit 32 is included in the allowed user information.

If the authentication information received in step S10 is not included in the allowed user information, or in other words, if authentication fails because the authentication information received in step S10 is not the authentication information of a registered user, the image processing illustrated in FIG. 6 ends. Thereafter, the image processing device 10 limits usage of the image processing device 10 by the user who is not a registered user, so that even if an execution instruction to execute a function is received, the image processing device 10 does not execute the indicated function until the authentication information of a registered user is received.

On the other hand, if the authentication information received in step S10 is included in the allowed user information, or in other words, if the authentication information received in step S10 is the authentication information of a registered user, and authentication is successful, the user ID included in the authentication information and the authentication time are recorded in the history DB 39, and the process proceeds to step S30.

In step S30, the estimation unit 34 acquires respective history information included in the history DB 39 stored in the RAM 104.

In step S40, the estimation unit 34 determines whether or not past information history associated with the same user ID as the user ID included in the authentication information of the user who was authenticated successfully in step S20 exists among the history information acquired in step S30. Note that past history information refers to history information recorded before the history information recorded in the history DB 39 by the current operation of the image processing device 10 for which an execution instruction has not been given yet.

If past history information associated with the same user ID as the user ID included in the authentication information of the user who was authenticated successfully in step S20 does not exist among the history information acquired in step S30, estimating an expected function from the history information of the user is difficult, and thus the estimation unit 34 does not estimate the expected function, and instead proceeds to step S70 described later.

On the other hand, if past information history associated with the same user ID as the user ID included in the authentication information of the user who was authenticated successfully in step S20 exists among the history information acquired in step S30, the flow proceeds to step S50.

In step S50, the estimation unit 34 references the history information of the user, and executes an expected function estimation process that estimates an expected function from among the multiple functions provided in the image processing device 10, on the basis of the execution frequency of the functions. Note that the content of the expected function estimation process will be described in detail later.

In step S60, the control unit 35 controls each of the parts used in the execution of the expected function estimated by the estimation unit 34 in step S50, so that the related parts come out of the dormant state and into the active state.

Specifically, the control unit 35 references a function-related parts table 40 as illustrated in FIG. 7, which is stored in the non-volatile memory 108, for example, and controls the related parts of the expected function.

As illustrated in FIG. 7, in the function-related parts table 40, the parts used to execute each function provided in the image processing device 10 are associated with each respective function. In the function-related parts table 40, "O" indicates that the part is used in the execution of the corresponding function, whereas "X" indicates that the part is not used in the execution of the corresponding function.

For example, the function-related parts table 40 indicates that in the case of the copy function, the document reading unit 12 that reads the document 20 to generate image data and the image forming unit 14 that forms the generated image onto a recording medium are the related parts of the copy function, whereas the communication unit 37 and the external terminal 30 are not related parts of the copy function.

Consequently, if the expected function estimated by the expected function estimation process in step S50 is the copy function, the control unit 35 controls the document reading unit 12 and the image forming unit 14 by supplying a voltage having a magnitude causing the document reading unit 12 and the image forming unit 14 to go to the active state, thereby causing the document reading unit 12 and the image forming unit 14 to start preparing for operation.

In this case, since the parts other than the related parts of the expected function are kept in the dormant state, when executing a function, power consumption in the image processing device 10 is reduced compared to the case of putting each of the parts included in the image processing device 10 in the active state.

Note that the function-related parts table 40 illustrated in FIG. 7 is an example, and depending on differences in the functions and parts provided in the image processing device 10, a function-related parts table 40 with different content may be stored in the non-volatile memory 108.

In step S70, the control unit 35 stands by until the reception unit 32 receives an execution instruction to execute some kind of function from the user.

In step S40, in the case of determining that past information history associated with the same user ID as the user ID included in the authentication information of the user who was authenticated successfully in step S20 does not exist among the history information acquired in step S30, steps S50 and S60 are not executed, and thus all parts of the image processing device 10 are in the dormant state. Consequently, in this case, after receiving a function execution instruction from the user, the control unit 35 references the function-related parts table 40, and controls the related parts of the function indicated by the execution instruction to go from the dormant state to the active state.

On the other hand, in step S40, in the case of determining that past information history associated with the same user ID as the user ID included in the authentication information of the user who was authenticated successfully in step S20 exists among the history information acquired in step S30, step S70 is executed after the related parts of the expected function obtained in step S50 start preparing for operation. Consequently, if the function indicated by the execution instruction from the user is the same as the expected function estimated in step S50, the indicated function may be executed with less wait time compared to the case of making the related parts of the function indicated by the execution instruction go from the dormant state to the active state after the execution instruction is received.

Figure 8:
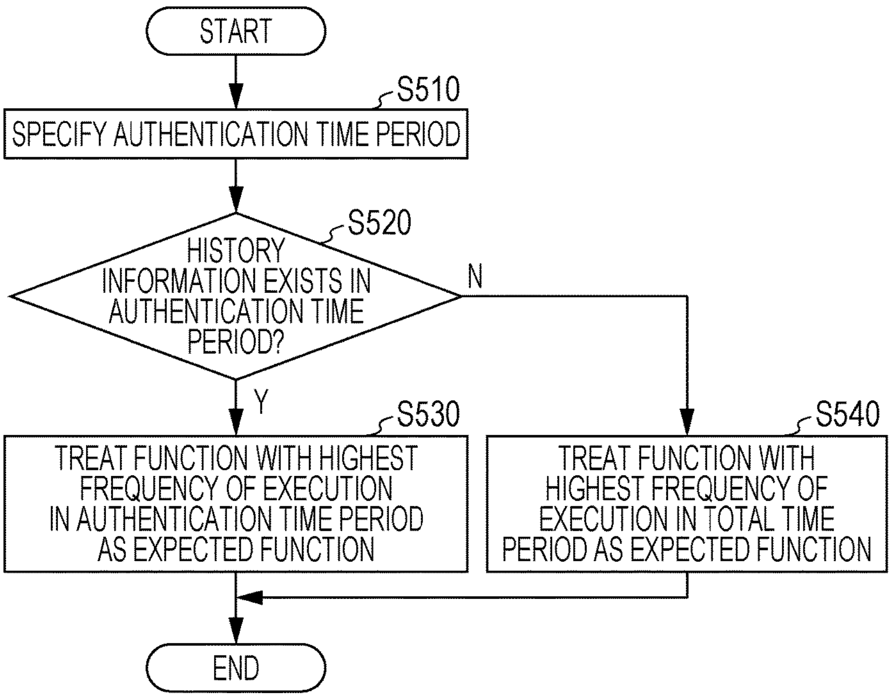
FIG. 8 is a flowchart illustrating an example of the flow of an expected function estimation process.

Next, the content of the expected function estimation process in step S50 will be described. FIG. 8 is a flowchart illustrating an example of the flow of the expected function estimation process.

First, in step S510, the estimation unit 34 acquires, from the history information, the authentication time at which the user is authenticated as a registered user in step S20 of FIG. 6. Subsequently, the estimation unit 34 specifies a time period that includes the acquired authentication time (authentication time period).

In the estimation unit 34, a single day is managed by being categorized into multiple time periods. The categorization of the time periods is not particularly limited. For example, time periods of a length suited to estimating the expected function, such as units of one hour, units of two hours, or the times during which users are at work, may be used. Herein, as an example, the case of using time periods categorized in units of one hour on the hour as a reference will be described.

In step S520, the estimation unit 34 references the history DB 39, and determines whether or not history information having an authentication time included in authentication time period specified in step S510 (that is, history information in the authentication time period) is included among the history information associated with the same user ID as the user ID of the user who was successfully authenticated in step S20 of FIG. 6.

If the determination process in step S520 is positive, the flow proceeds to step S530, whereas if negative, the flow proceeds to step S540.

In step S530, the estimation unit 34 references the functions used in the history information in the authentication time period for the user, and estimates the most frequently executed function in the authentication time period as the expected function.

At this point, if the user ID of the user is "User-A", and the authentication time in step S20 of FIG. 6 is 10:05:00, the estimation unit 34 specifies the time period including 10:05:00, namely the time period from 10:00:00 to 10:59:59, as the authentication time period.

Consequently, in the case of the history DB 39 as illustrated in FIG. 4, the estimation unit 34 references the function used in the history information for No. 1, No. 5, and No. 7 in the same authentication time period, and estimates the print function as the expected function.

This is an example of estimating the expected function by utilizing the tendency of the user to perform the same actions depending on the time period. For example, there is a tendency for regularly-held meetings to be started at a predetermined time, and since materials used in such meetings are created, the user may repeatedly execute the same function in the same time period. Consequently, by taking the most frequently executed function in the authentication time period as the expected function, the estimation unit 34 improves the estimation accuracy of the expected function in the authentication time period.

On the other hand, if the determination process in step S520 is negative, the execution frequency of functions executed in the authentication time period by the user thus far is not acquired. Consequently, in step S540, the estimation unit 34 references the function used in each piece of history information for the user recorded in the history DB 39, and estimates the most frequently executed function in the history information as the expected function.

At this point, if the user ID of the user is "User-A", and the authentication time in step S20 of FIG. 6 is 12:45:00, the estimation unit 34 specifies the time period including 12:45:00, namely the time period from 12:00:00 to 12:59:59, as the authentication time period.

In the case of the history DB 39 as illustrated in FIG. 4, since history information for which the authentication time is included in the time period from 12:00:00 to 12:59:59 does not exist, the estimation unit 34 references the function used in the history information with the user ID "User-A" included in the history DB 39, namely the history information for No. 1, No. 5, No. 7, and No. 8, and estimates the print function as the expected function.

Note that in the example discussed above, the most frequently executed function in the history information with the same authentication time period is estimated as the expected function, but the method of estimating the expected function is not limited thereto.

For example, the most frequently executed function from among the functions executed by a user on the same weekday as the weekday when the relevant user is authenticated as a registered user may be estimated as the expected function. This is an example of estimating the expected function by utilizing the tendency of the user to perform the same actions on the same days of the week.

In addition, in history information of a user that includes the same combination of the authentication time period and the weekday when the relevant user is authenticated as a registered user, the most frequently executed function may be estimated as the expected function.

With the above, the expected function estimation process illustrated in FIG. 8 ends.

Note that in the flowchart of the image processing program illustrated in FIG. 6, if the determination process in step S40 is negative, the image processing device 10 does not estimate the expected function, and stands by until the reception unit 32 receives an execution instruction to execute some kind of function from the user.

Accordingly, if the determination process in step S40 is negative, the history information for each person in the organization to which the user successfully authenticated in step S20 belongs, or in other words, the history information of each member of the organization, may be used to estimate the expected function. This is an example of estimating the expected function by utilizing the tendency of members belonging to the same organization to perform the same actions as the user, since such members share the same conference times and the like in common compared to the members of other organizations.

In other words, if the determination process in step S40 is negative, the expected function estimation process illustrated in FIG. 8 may be executed. However, in this case, the history DB 39 does not include the history information of the user who was successfully authenticated in step S20. Consequently, in step S520, the estimation unit 34 references the history DB 39, and determines whether or not history information having the same authentication time as the authentication time period of the user is included among the history information associated with the same user ID as each user ID of each member belonging to the same organization as the user who was successfully authenticated in step S20 of FIG. 6.

If the determination process in step S520 is positive, in step S530, the estimation unit 34 may reference the function used of the history information having the same authentication time as the authentication time period of the user from among the history information of each member belonging to the same organization as the user, and estimate the most frequently executed function in the authentication time period as the expected function.

On the other hand, if the determination process in step S520 is negative, in step S540, the estimation unit 34 may reference the history information of each member belonging to the same organization as the user, and estimate the most frequently executed function in the history information as the expected function.

Note that in the example discussed above, the history information which is of each member belonging to the same organization as the user and which has the same authentication time as the authentication time period of the user is used to estimate the most frequently executed function in the authentication time period of the user as the expected function, but the method of estimating the expected function is not limited thereto.

For example, the most frequently executed function from among the functions executed by each member belonging to the same organization as the user on the same weekday as the weekday when the relevant user is authenticated as a registered user may be estimated as the expected function.

In addition, in the history information of each member belonging to the same organization as the user that includes the same combination of the authentication information time period and the weekday when the user is authenticated as a registered user, the most frequently executed function may be estimated as the expected function.

Note that the organization to which the user belongs refers to a group of people defined to manage or identify users in units of companies, or alternatively, in units of divisions or sections within a company, for example.

In addition, the image processing device 10 may execute the image processing program illustrated in FIG. 9 subsequently after the image processing program illustrated in FIG. 6.

Figure 9:
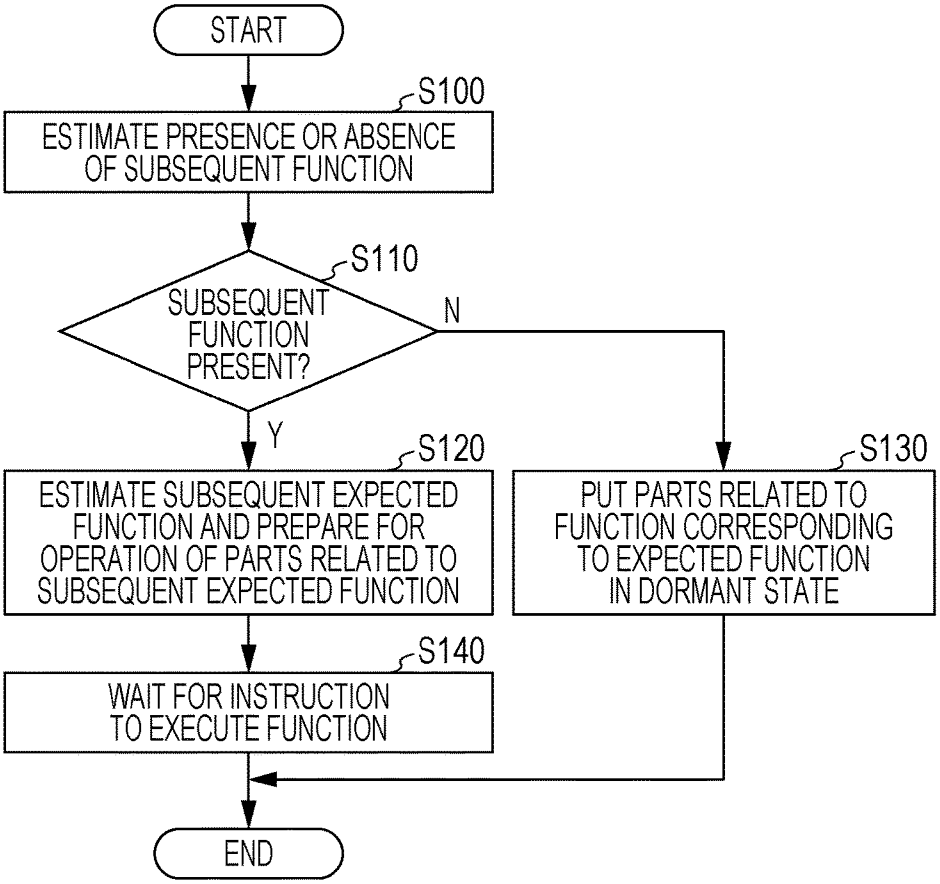
FIG. 9 is a flowchart illustrating an example of the flow of an image processing program according to a first exemplary embodiment.

FIG. 9 is a flowchart illustrating an example of the flow of an image processing program executed by the CPU 102. The image processing program illustrated in FIG. 9 is installed in advance in the HDD 106, for example.

In step S100, the estimation unit 34 estimates whether or not there exists a function (subsequent function) to be executed by the same user who was authenticated as a registered user in step S20, subsequent to the expected function estimated in step S50 of FIG. 6.

Whether or not a subsequent function by same user exists is determined by analyzing the content of the history information of the user included in the history DB 39, for example. Specifically, when multiple functions are executed by the same user within a predetermined amount of time, a subsequent execution period during which the user is treated as subsequently executing a function is prescribed, and if history information exists in which the same user additionally executes some kind of function within the subsequent execution period after executing the same function as the function indicated by the execution instruction received in step S70, the estimation unit 34 estimates that a subsequent function exists.

In step S110, if a subsequent function is estimated to exist, the flow proceeds to step S120.

In step S120, the estimation unit 34 references the history DB 39, and estimates the most frequently executed function from among the functions executed within the subsequent execution period after executing the same function as the function indicated by the execution instruction received in step S70 as the subsequent expected function.

Subsequently, the control unit 35 follows the content already described in step S60 of FIG. 6, and controls each of the related parts of the subsequent expected function so that the related parts come out of the dormant state and into the active state.

In step S140, the control unit 35 stands by until the reception unit 32 receives an execution instruction to execute a subsequent function from the user.

In other words, even if a different function is executed subsequently by the user, in some cases the image processing device 10 is able to make the parts related to the latter function go from the dormant state to the active state, before the execution instruction to execute the latter function is received.

On the other hand, if a subsequent function is estimated not to exist in step S110, the flow proceeds to step S130.

Subsequently, in step S130, after the execution of the function corresponding to the expected function estimated in step S50 of FIG. 6, the control unit 35 controls the related parts of the function corresponding to the expected function so that the related parts go from the active state to the dormant state.

Herein, the "function corresponding to the expected function" refers to the expected function if the function indicated by the execution instruction received in step S70 is the same as the expected function, and to the function indicated by the execution instruction if the function indicated by the execution instruction received in step S70 is different from the expected function.

With the above, the image processing illustrated in FIG. 9 ends.

In this way, according to the image processing device 10 according to the first exemplary embodiment, the history information of the user is used to estimate the function most frequently executed by the user as the expected function, under a predetermined condition generated by combining the authentication time period and the weekday. Subsequently, the image processing device 10 controls the related parts of the expected function before an execution instruction to execute some kind of function is received from the user, thereby causing the related parts to start preparing to go to the active state.

Consequently, the wait time until the indicated function is started may be shortened compared to a case in which the preparatory operation by the parts related to a function is started after an execution instruction to execute that function is received from the user.

Also, if the image processing device 10 estimates that a subsequent function to be executed after executing the function indicated by the user does not exist, the image processing device 10 sets the parts related to the executed function from the active state to the dormant state.

Consequently, power consumption in the image processing device 10 may be reduced compared to a case in which the parts related to the executed function are not set to the dormant state even though it is estimated that a function to be executed subsequently does not exist.

Second Exemplary Embodiment

The image processing device 10 according to the first exemplary embodiment estimates the function most frequently executed by the user as the expected function, under a predetermined condition generated by combining the authentication time period and the weekday.

The second exemplary embodiment describes an image processing device 10A that, in addition to the function estimation method by the image processing device 10, estimates the expected function by additionally using the difference between the data registration time and the authentication time.

In the exemplary configuration and the exemplary schematic configuration of the electrical subsystem of the image processing device 10A according to the second exemplary embodiment, the same configurations as in FIG. 3, which illustrates an exemplary configuration of the image processing device 10 according to the first exemplary embodiment, and FIG. 5, which illustrates an exemplary schematic configuration of the electrical subsystem, are applied.

Figure 10:
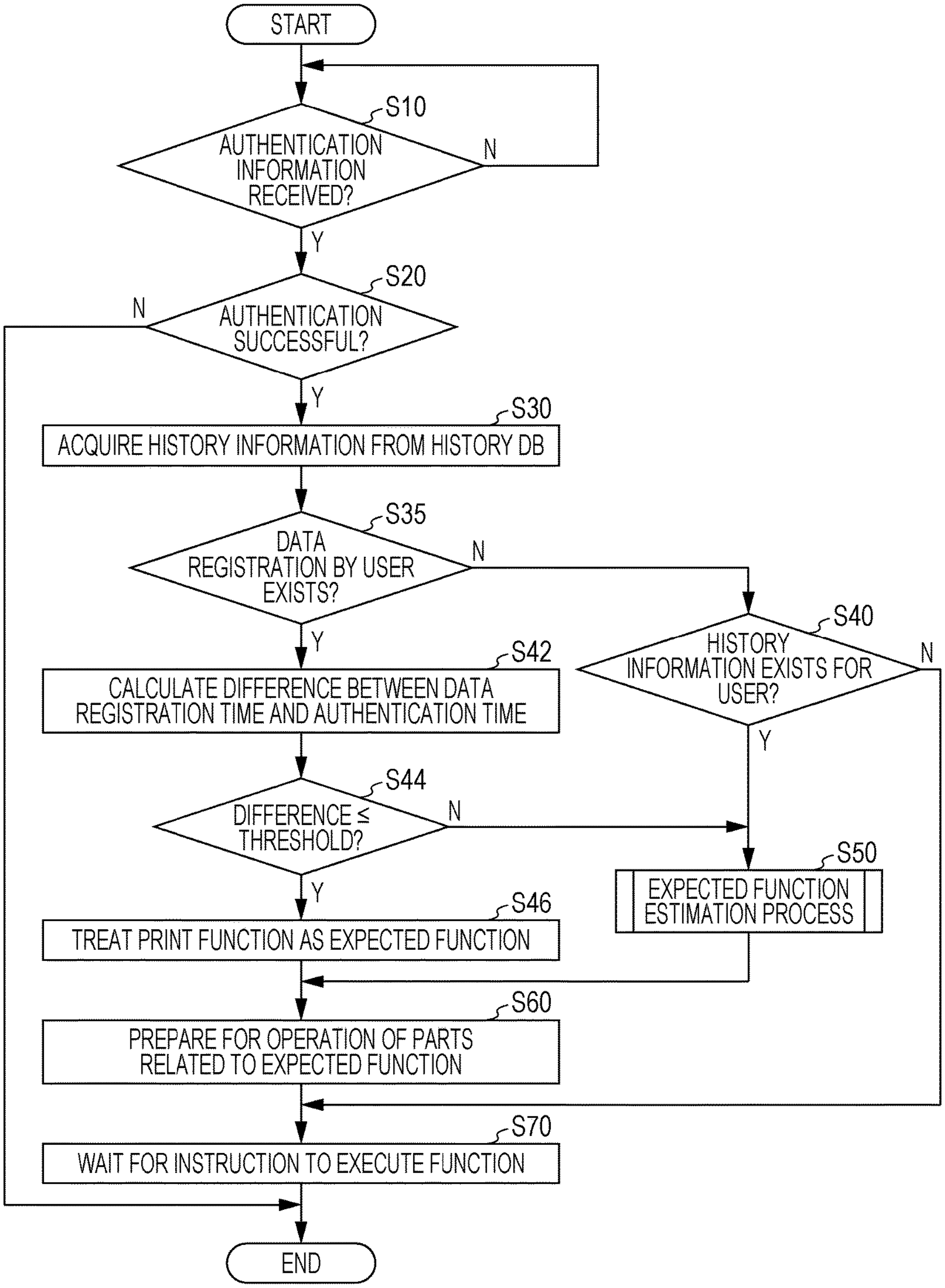
FIG. 10 is a flowchart illustrating an example of the flow of an image processing program according to a second exemplary embodiment.

FIG. 10 is a flowchart illustrating an example of the flow of an image processing program executed by the CPU 102 when the image processing device 10A is powered on and in a standby state in which the image processing device 10A is not executing any function. The image processing program illustrated in FIG. 10 is installed in advance in the HDD 106, for example.

The flowchart of the image processing program illustrated in FIG. 10 is different from the flowchart of the image processing program according to the first exemplary embodiment illustrated in FIG. 6 in that step S35 and steps S42 to S46 have been added, while the other processes are the same as FIG. 6.

In step S35, the estimation unit 34 determines whether or not the user who was successfully authenticated in step S20 transmitted image data image processing device 10A prior to authentication, or in other words, whether or not a data registration time is recorded in the latest history information of the relevant user.

If the determination process in step S35 is negative, the flow proceeds to step S40, the same process as the process already described in the first exemplary embodiment is conducted, and if past history information of the user is included in the history DB 39, the expected function is estimated from the history information of the user.

Note that even if the determination process in step S40 is negative, as described in the first exemplary embodiment, the history information of members belonging to the same organization of the user may also be used to estimate the expected function.

On the other hand, if the determination process in step S35 is positive, the flow proceeds to step S42.

In step S42, the estimation unit 34 references the latest history information of the user who was successfully authenticated in step S20, and computes the difference between the data registration time and the authentication time, or in other words, the amount of time from the data registration time to the authentication time. Note that at this point, an execution instruction to execute a function has not been received from the user, and thus the function used is not recorded in the latest history information of the user.

In cases in which the user executes the print function, there is a tendency for the user to transmit image data to print to the image processing device 10A in advance, and move to the image processing device 10B quickly compared to the case of executing a function other than the print function in order to retrieve the recording medium on which the image data is formed.

In other words, a user who conducts authentication within a predetermined amount of time after transmitting image data to the image processing device 10A is estimated to have a higher likelihood of executing the print function compared to other functions. Consequently, with regard to the time from the user transmitting image data to the image processing device 10A up to conducting authentication, an amount of time within which the user is considered to be able to conduct authentication and execute the print function is treated as a threshold value, and stored in advance in the non-volatile memory 108, for example. Note that a different threshold value may also be set for each user. Specifically, the history information for each user is referenced, and the average value of the difference between the data registration time and the authentication time in the case of executing the print function is set as the threshold value of the user whose history information is being referenced.

Subsequently, in step S44, the estimation unit 34 determines whether or not the difference computed in step S42 is less than or equal to the threshold value. If the determination process in step S44 is positive, the flow proceeds to step S46.

In step S46, since the difference computed in step S42 is less than or equal to the threshold value, the estimation unit 34 estimates the print function as the expected function, and subsequently executes the processes in step S60 and thereafter as already described.

On the other hand, if the determination process in step S44 is negative, it is difficult for the estimation unit 34 to estimate that the user will execute the print function based on the difference between the data registration time and the authentication time. For this reason, the flow proceeds to step S50, the expected function estimation process already described is executed, and the expected function is estimated.

Note that in the image processing program of FIG. 10, in step S70, the control unit 35 stands by until the reception unit 32 receives an execution instruction to execute some kind of function from the user. However, if the difference between the data registration time and the authentication time is less than or equal to the threshold value, it is conceivable that the user wants to retrieve the recording medium on which the image is formed as quickly as possible. For this reason, after the preparatory operation by the parts related to the print function is completed and the related parts go to the active state, the control unit 35 may control the image forming unit 14 to print image data onto a recording medium before an execution instruction to execute some kind of function is received from the user.

In addition, the image processing device 10A may also execute the image processing program illustrated in FIG. 9 after the image processing program illustrated in FIG. 10, and if the image processing device 10A estimates that a subsequent function to be executed after executing the function indicated by the user does not exist, the image processing device 10A may set the parts related to the executed function from the active state to the dormant state.

In this way, according to the image processing device 10A according to the second exemplary embodiment, when the user registers image data, the difference between the data registration time and authentication time is computed, and if the difference is less than or equal to a threshold value, the print function is estimated as the expected function. Subsequently, the image processing device 10A controls the related part, of the print function before an execution instruction to execute some kind of function is received from the user, thereby causing the related parts to start preparing to go to the active state.

Consequently, in some cases the image processing device 10A is able to estimate the function that the user is to execute, irrespectively of the execution frequency of each function.

Third Exemplary Embodiment

In the image processing device 10A according to the second exemplary embodiment, after image data is registered in the image processing device 10A and user authentication is conducted, the difference between the data registration time of the image data and the authentication time is computed, and if the computed difference is less than or equal to a threshold value, the print function is estimated as the expected function.

In the third exemplary embodiment, an image processing device 10B that estimates the expected function before user authentication is conducted will be described.

In the exemplary configuration and the exemplary schematic configuration of the electrical subsystem of the image processing device 10B according to the third exemplary embodiment, the same configurations as in FIG. 3, which illustrates an exemplary configuration of the image processing device 10 according to the first exemplary embodiment, and FIG. 5, which illustrates an exemplary schematic configuration of the electrical subsystem, are applied.

Figure 11:
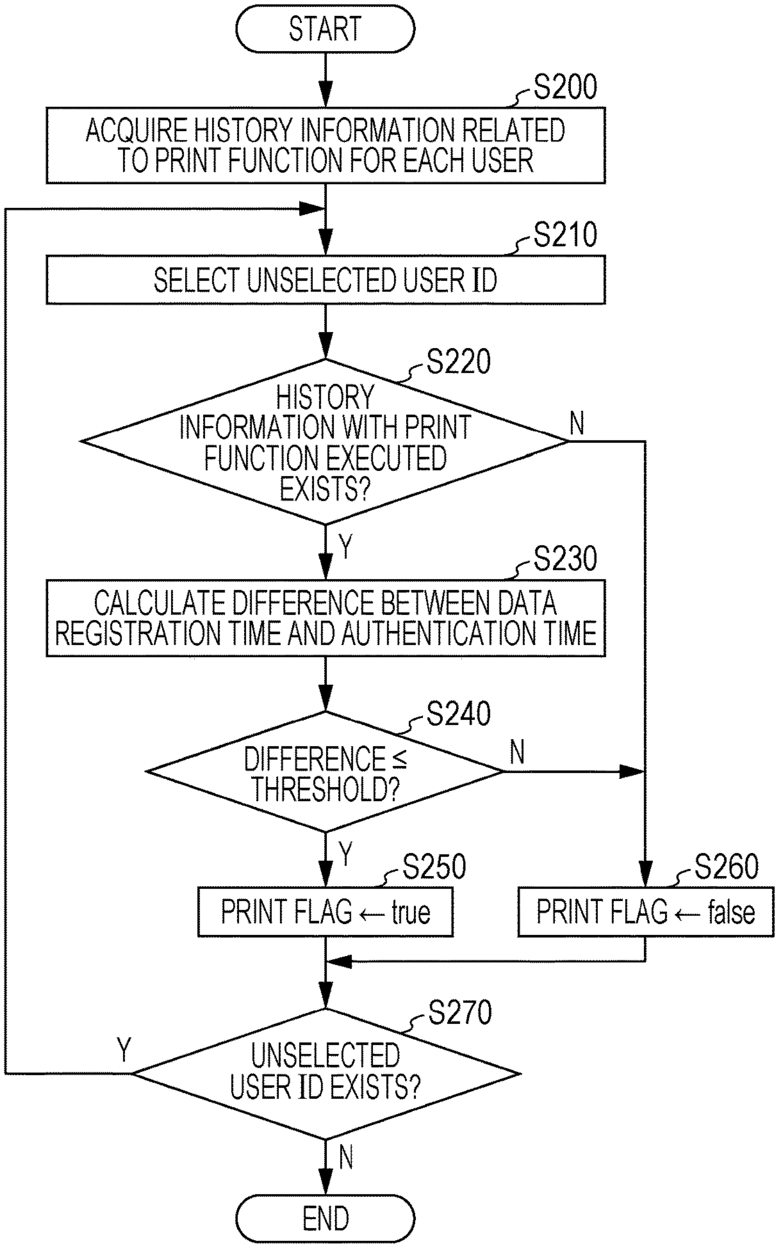
FIG. 11 is a flowchart illustrating an example of the flow of a first image processing program according to a third exemplary embodiment.

FIG. 11 is a flowchart illustrating an example of the flow of an image processing program executed by the CPU 102 when the image processing device 10A is powered on, but before executing the image processing program illustrated in FIG. 12 described later. The image processing program illustrated in FIG. 11 is installed in advance in the HDD 106, for example.

First, in step S200, the estimation unit 34 references the history DB 39 and acquires, for each user ID, the history information in which "print" is recorded as the function used.

In step S210, the estimation unit 34 references the allowed user information of the image processing device 10B acquired from the information server 7, and selects one user ID of an unselected registered user.

In step S220, the estimation unit 34 determines whether or not history information for the user ID selected in step S210 exists in the history information acquired in step S200.

A negative determination in the determination process in step S220 means that the user corresponding to the user ID selected in step S210 has not yet executed the print function. Consequently, it is difficult to estimate whether or not the user will execute the print function based on the difference between the data registration time and the authentication time. For this reason, the flow proceeds to step S260, and in step S260, the estimation unit 34 sets a print flag to "false" for the user corresponding to the user ID selected in step S210.

The print flag is an identifier that indicates whether or not the user has a tendency of executing the print function when image data is registered in the image processing device 10B, and is assigned to each user. If the set value of the print flag is "true", the print flag indicates that the user has a tendency of executing the print function, whereas if the set value is "false", the print flag indicates that the user does not have a tendency of executing the print function.

On the other hand, if the determination process in step S220 is positive, the flow proceeds to step S230.

In step S230, the estimation unit 34 references the history information for the user ID acquired in step S200 and selected in step S210, and computes the difference between the data registration time and the authentication time. Note that the method of computing the difference is not limited, and the difference may be computed using a variety of methods.

For example, if there are multiple pieces of history information for the user ID selected in step S210, the average value of the difference between the data registration time and the authentication time computed for each piece of history information may be treated as the difference between the data registration time and the authentication time. Alternatively, the maximum value or the minimum value from among the differences between the data registration time and the authentication time computed for each piece of history information may be treated as the difference between the data registration time and the authentication time.

In step S240, the estimation unit 34 determines whether or not the difference computed in step S230 is less than or equal to a threshold value. Note that for this threshold value, the same value as the threshold value described in the second exemplary embodiment may be used.

Subsequently, if the difference computed in step S230 is less than or equal to the threshold value, the flow proceeds to step S250. In step S250, the estimation unit 34 sets the print flag to "true" for the user corresponding to the user ID selected in step S210.

On the other hand, if the difference computed in step S230 is not less than or equal to the threshold value, the flow proceeds to step S260. If the user does not conduct authentication on the image processing device 10B within the time expressed by the threshold value, there is a possibility that a function other than the print function may be executed by the user. Consequently, in step S260, the estimation unit 34 sets the print flag to "false" for the user corresponding to the user ID selected in step S210.

In step S2170, the estimation unit 34 determines whether or not a user ID that has not been selected in step S210 yet exists among the user IDs of the registered users included in the allowed user information.

If a user ID that has not been selected in step S210 exists, the flow proceeds to step S210. Subsequently, the estimation unit 34 repeats the processes from steps S210 to S270 until all user IDs of the registered users included in the allowed user information have been selected in step S210, and the print flag associated with each user ID is set to "true" or "false".

On the other hand, if all user IDs of the registered users included in the allowed user information have been selected in step S210, the image processing program illustrated in FIG. 11 ends.

According to the above, the value of the print flag is set to "true" or "false" for each registered user of the image processing device 10B.

Figure 12:
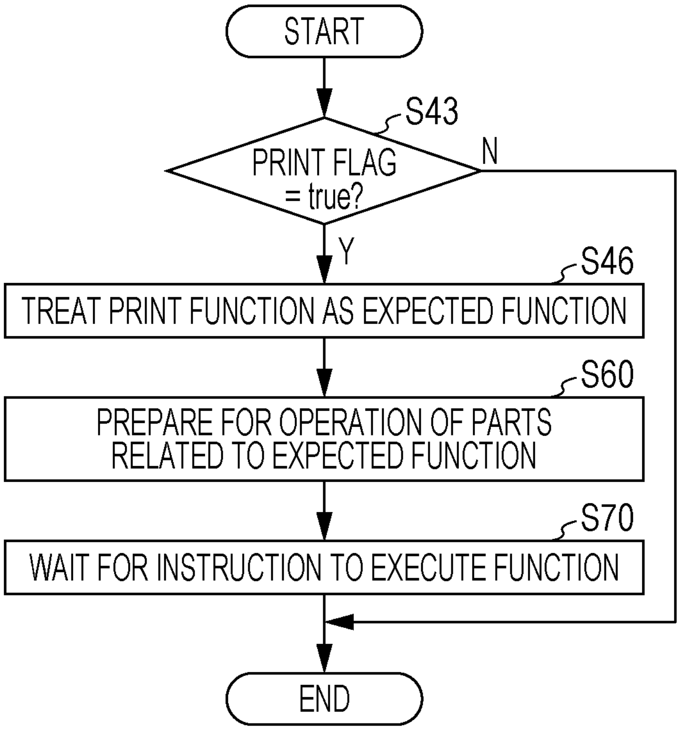
FIG. 12 is a flowchart illustrating an example of the flow of a second image processing program according to a third exemplary embodiment.

FIG. 12 is a flowchart illustrating an example of the flow of an image processing program executed by the document reading unit 12 when the image processing device 10B is in a standby state not executing any function, and in addition, the image processing device 10B receives image data from the terminal 3. The image processing program illustrated in FIG. 12 is installed in advance in the HDD 106, for example.

As described already, the image processing device 10B executes the image processing program illustrated in FIG. 11 before receiving image data from the terminal 3. Consequently, when executing the image processing program illustrated in FIG. 12, the value of the print flag is set to "true" or "false" for each registered user of the image processing device 10B.

Note that when the reception unit 32 of the image processing device 10B receives image data from the terminal 3, the user ID attached to the image data is taken to be stored in a predetermined region of the RAM 104, for example.

In step S43, the estimation unit 34 acquires the user ID attached to the image data from the RAM 104, and determines whether or not the print flag corresponding to the acquired user ID is "true". If the print flag is "true", the flow proceeds to step S46.

If the print flag is "true", according to analysis of the history information, it is conceivable that the user who transmitted the image data will conduct authentication on the image processing device 10B within an amount of time expressed by a threshold value after the image data is received. For this reason, the estimation unit 34 estimates the print function as the expected function, and executes the process in step S60 and thereafter as described already.

In other words, the image processing device 10B estimates the expected function before user authentication is conducted, and more specifically, when the image data is received.

On the other hand, if the print flag is "false" in the determination process of step S43, it is conceivable that even if image data is received, the user that transmitted the image data may execute a function different from the print function. For this reason, the image processing program illustrated in FIG. 12 ends.

Note that if the print flag is "false", by executing the image processing program illustrated in FIG. 6 or FIG. 10 described earlier after the image processing program of FIG. 12, the expected function is estimated after authentication information is received from the user.

In this way, according to the image processing device 10B according to the third exemplary embodiment, if the user registers image data in the image processing device 10B, it is determined on the basis of history information whether or not the user has a tendency of executing the print function. If image data is registered in the image processing device 10B by a user who has a tendency to execute the print function, the parts related to the print function are taken out of the dormant state and put into the active state.

Consequently, compared to the case of starting the estimation of the expected function after the user conducts authentication, the print function may be executed with less wait time.

The foregoing thus describes the present invention using exemplary embodiments, but the present invention is not limited to the scope described in the exemplary embodiments. Various modifications or alterations may be made to the foregoing exemplary embodiment within a scope that does not depart from the gist of the present invention, and any embodiments obtained by such modifications or alterations are also included in the technical scope of the present invention. For example, the order of processes may be modified without departing from the gist of the present invention.

In addition, in the exemplary embodiments, an example is described in which the history DB 39 is placed in the information server 7, but the history DB 39 may also be placed in the image processing device. In this case, the information server 7 may be omitted, and cost of the image processing system 1 potentially may be reduced.

In addition, in the foregoing exemplary embodiments, a configuration in which the processes in the image processing device are realized with software is described as an example, but processes similar to each of the flowcharts illustrated in FIG. 6 and FIGS. 8 to 12 may also be processed by hardware. In this case, the processes potentially may be conducted faster compared to the case of realizing the processes of the image processing device with software.

In addition, although the foregoing exemplary embodiments describe the image processing program as being installed in the HDD 106, the configuration is not limited thereto. An image processing program according to the present invention may also be provided by being recorded on a computer-readable recording medium. For example, an image processing program according to the present invention may also be provided by being stored on an optical disc, such as a Compact Disc-Read-Only Memory (CD-ROM) or a Digital Versatile Disc-Read-Only Memory (DVD-ROM), for example. Also, an image processing program according to the present invention may also be provided by being recorded on semiconductor memory such as flash memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device, comprising:

a processor programmed to:

use authentication information received from a user to authenticate and determine whether or not the user is a person allowed to execute a plurality of functions related to images;

if the user is authenticated as a registered user allowed to execute the plurality of functions, use (i) history information recording information related to the execution of the plurality of functions and (ii) a difference between a time when the user registers image data in a storage and a time when the user is authenticated as the registered user, to estimate a function to be executed by the user from among the plurality of functions; and supply a voltage to related parts used to execute the estimated function so that the related parts start preparing for operation before the user issues an instruction to execute one of the plurality of functions.

2. The image processing device according to claim 1, wherein the processor is programmed to estimate a function frequently executed by the user from among the plurality of functions as the function to be executed by the user.

3. The image processing device according to claim 1, wherein the processor is programmed to:

use history information for each person belonging to a same organization as the user; and estimate a function frequently executed by each person from among the plurality of functions as the function to be executed by the user.

4. The image processing device according to claim 2, wherein the processor is programmed to estimate a function frequently executed by the user or each person belonging to a same organization as the user from among the plurality of functions in a same time period as a time period in which the user is authenticated as the registered user as the function to be executed by the user.

5. The image processing device according to claim 2, wherein the processor is programmed to estimate a function frequently executed by the user or each person belonging to a same organization as the user from among the plurality of functions on a same weekday as a weekday on which the user is authenticated as the registered user as the function to be executed by the user.

6. The image processing device according to claim 1, wherein the processor is programmed to, if the image processing device finishes preparing for operation, control the image processing device to form an image corresponding to the image data registered in the storage by the user on a recording medium, before the user issues an instruction to execute one of the plurality of functions.

7. The image processing device according to claim 1, wherein the processor is programmed to:

estimate whether or not a subsequent function is to be executed subsequently after the estimated function; and if the subsequent function is not to be executed, control the related parts used to execute the estimated function so that the related parts go to a dormant state after the estimated function is executed.

8. A non-transitory computer readable medium storing a program causing a computer to execute a process for processing an image, the process comprising:

using authentication information received from a user to authenticate and determine whether or not the user is a person allowed to execute a plurality of functions related to images;

if the user is authenticated as a registered user allowed to execute the plurality of functions, using (i) history information recording information related to the execution of the plurality of functions and (ii) a difference between a time when the user registers image data in a storage and a time when the user is authenticated as the registered user, to estimate a function to be executed by the user from among the plurality of functions; and supplying a voltage to related parts used to execute the estimated function so that the related parts start preparing for operation before the user issues an instruction to execute one of the plurality of functions.

9. An image processing device, comprising:

a processor programmed to:

use authentication information received from a user to authenticate and determine whether or not the user is a person allowed to execute a plurality of functions related to images;

if the authenticator authenticates the user as a registered user allowed to execute the plurality of functions, use (i) history information recording information related to the execution of the plurality of functions and (ii) a difference between a time when the user registers image data in a storage and a time when the user is authenticated as the registered user, to estimate a function to be executed by the user from among the plurality of functions; and change a dormant state of related parts used to execute the estimated function to an active state, so that the related parts start preparing for operation before the user issues an instruction to execute one of the plurality of functions.

10. The image processing device according to claim 9, wherein the processor is programmed to estimate a function frequently executed by the user from among the plurality of functions as the function to be executed by the user.

11. The image processing device according to claim 9, wherein the processor is programmed to:

use history information for each person belonging to a same organization as the user; and estimate a function frequently executed by each person from among the plurality of functions as the function to be executed by the user.

12. The image processing device according to claim 10, wherein the processor is programmed to estimate a function frequently executed by the user or each person belonging to a same organization as the user from among the plurality of functions in a same time period as a time period in which the user is authenticated as the registered user as the function to be executed by the user.

13. The image processing device according to claim 10, wherein the processor is programmed to estimate a function frequently executed by the user or each person belonging to a same organization as the user from among the plurality of functions on a same weekday as a weekday on which the user is authenticated as the registered user as the function to be executed by the user.

14. The image processing device according to claim 9, wherein the processor is programmed to, if the image processing device finishes preparing for operation, control the image processing device to form an image corresponding to the image data registered in the storage by the user on a recording medium, before the user issues an instruction to execute one of the plurality of functions.

15. The image processing device according to claim 9, wherein the processor is programmed to:

estimate whether or not a subsequent function is to be executed subsequently after the estimated function; and if the subsequent function is not to be executed, control the related parts used to execute the estimated function so that the related parts go to the dormant state after the estimated function is executed.

* * * * *